(12) United States Patent
Suchak

(10) Patent No.: US 9,764,281 B2
(45) Date of Patent: Sep. 19, 2017

(54) PROCESS FOR THE REMOVAL OF CONTAMINANTS FROM FLUE GAS STREAMS

(71) Applicant: Cannon Technology, Inc., Natrona Heights, PA (US)

(72) Inventor: Naresh J Suchak, Glen Rock, NJ (US)

(73) Assignee: Cannon Technology, Inc., Natrona Heights, PA (US)

( * ) Notice: Subject to any disclaimer, the term of this patent is extended or adjusted under 35 U.S.C. 154(b) by 0 days.

(21) Appl. No.: 14/757,339

(22) Filed: Dec. 18, 2015

(65) Prior Publication Data

US 2017/0173525 A1    Jun. 22, 2017

(51) Int. Cl.
     *B01D 53/56*     (2006.01)
     *B01D 53/60*     (2006.01)
     (Continued)

(52) U.S. Cl.
     CPC ......... *B01D 53/78* (2013.01); *B01D 53/1456* (2013.01); *B01D 53/1493* (2013.01); *B01D 53/50* (2013.01); *B01D 53/56* (2013.01); *B01D 53/64* (2013.01); *B01D 53/75* (2013.01); *B01D 2251/104* (2013.01); *B01D 2252/102* (2013.01);
     (Continued)

(58) Field of Classification Search
     CPC ........ B01D 53/56; B01D 53/60; B01D 53/75; B01D 53/78; B01D 2257/404; B01D 2258/0283
     See application file for complete search history.

(56) References Cited

U.S. PATENT DOCUMENTS 4,011,298 A * 3/1977 Fukui .................. B01D 53/34
                                                                                  423/235
4,035,470 A     7/1977 Senjo et al.
(Continued)

FOREIGN PATENT DOCUMENTS

DE           2752918 A1 *   5/1979  ............. B01D 53/60

OTHER PUBLICATIONS

"Absorption Nitrogen Oxides in Alkaline Solutions: Selected Manufacture of Sodium Nitrite", Suchak et al., Ind.Eng.Chem.Res., vol. 29, p. 1492-1502 1990.

(Continued)

*Primary Examiner* — Timothy Vanoy
(74) *Attorney, Agent, or Firm* — Price & Adams

(57) ABSTRACT

A flue gas stream arising from fossil fuel fired sources containing nitrogen oxide contaminants is conveyed through an exhaust duct into a quencher. In the quencher aqueous medium is sprayed into contact with the flue gas stream. The quenched flue gas stream is mixed with ozone distributed at a high velocity in a sub-stoichiometric amount for partial oxidation of $NO_x$ to form $NO_2$ and prevent the formation of $N_2O_5$. The flue gas containing $NO_2$ is absorbed into an acidic medium of a wet scrubber to form nitrous acid. In the scrubber the nitrous acid is mixed with selected compounds of ammonia to decompose the nitrous acid for release of nitrogen. With this process the consumption of ozone and the operating costs associated therewith eliminate the requirement to dispose of nitrate recovered from the scrubber purge stream.

18 Claims, 3 Drawing Sheets

(51) Int. Cl.
  *B01D 53/75* (2006.01)
  *B01D 53/78* (2006.01)
  *B01D 53/14* (2006.01)
  *B01D 53/50* (2006.01)
  *B01D 53/64* (2006.01)

(52) U.S. Cl.
  CPC ........... *B01D 2252/2053* (2013.01); *B01D 2258/0283* (2013.01)

(56) References Cited

U.S. PATENT DOCUMENTS

| | | | |
|---|---|---|---|
| 4,107,271 A | 8/1978 | Atsukawa et al. | |
| 4,119,702 A | 10/1978 | Azuhata et al. | |
| 4,247,321 A | 1/1981 | Persinger | |
| 4,541,999 A | 9/1985 | Bechthold et al. | |
| 4,564,510 A | 1/1986 | Bechthold et al. | |
| 4,663,135 A * | 5/1987 | Miller | B01D 53/56 423/235 |
| 4,783,325 A * | 11/1988 | Jones | B01D 53/60 422/171 |
| 5,206,002 A | 4/1993 | Skelley et al. | |
| 5,348,715 A * | 9/1994 | Chang | B01D 53/60 423/235 |
| 6,162,409 A | 12/2000 | Skelley et al. | |
| 6,948,308 B2 * | 9/2005 | Chandler | B01D 53/56 423/213.2 |
| 7,303,735 B2 | 12/2007 | Suchak et al. | |
| 8,444,942 B2 * | 5/2013 | Suchak | B01D 47/06 423/210 |
| 8,865,098 B2 | 10/2014 | Suchak | |

OTHER PUBLICATIONS

"Selection of Reactive Solvent for Pollution Abatement of NOx, Jethani et al., Gas Separation & Purification", vol. 4, p. 8-26, Mar. 1990.

* cited by examiner

PROCESS FOR THE REMOVAL OF CONTAMINANTS FROM FLUE GAS STREAMS

BACKGROUND OF THE INVENTION

1. Field of the Invention

This invention relates to method and apparatus for removing contaminants, such as $NO_x$, $SO_x$, particulates, heavy metals, and other acid gases from flue gas streams arising from industrial combustion processes and, more particularly, to an improved method for removing $NO_x$ from a flue gas stream by partial oxidation with ozone.

2. Description of the Prior Art

Nitrogen oxides sulfur oxides ($SO_x$), particulates, heavy metals, and other acid gases are the main pollutants found in flue gases from chemical and combustion processes. The combustion and chemical processes generate flue streams with contaminants that need to be removed or cleaned-up before the flue gas is exhausted to the atmosphere. It is well known to remove nitrogen oxides from flue gas by a number of dry and wet processes, and sulfur oxides are removed by dry or wet scrubbing. Aqueous scrubbing is conventionally utilized to remove acid gases, such as $SO_x$, $Cl_2$, HCl, etc. particulates and other components. Nitric oxide, NO, is a major component of ($NO_x$) in combustion processes, and because it is almost insoluble, removal by aqueous scrubbing is negligible. Further, limited success has been achieved in using reagents for scrubbing $NO_x$.

Nitrogen oxides ($NO_x$) are generally formed in flue gas streams arising from combustion processes due to a number of factors, such as high flame temperature, nitrogenous compounds present in the fuel, and nitrogenous content of material subjected to combustion temperature, such as encountered with the incineration of waste. Nitrogen oxides formed at temperatures above 1,300° F. are mainly in the form of NO. Sulfur compounds in fuel convert to form $SO_x$. Other heteroatom compounds present in fossil fuel or combustion charge, such as chlorine, result in $Cl_2$ or HCl. Combustion of coal, solid fuel, or charge to a kiln or furnace generates particulate matter and other contaminants, such as heavy metals (Hg) which may or may not be effectively removed by aqueous scrubbing.

Known absorption processes that remove $NO_x$ from gas streams by contacting the $NO_x$ with ozone as well known in the art are disclosed in U.S. Pat. Nos. 5,206,002; 6,162,409; and 7,303,735. These processes utilize a multi-pollutant removal approach that has been implemented in the removing $NO_x$ from flue gas arising from gas fired boilers and removing multiple pollutants, including $NO_x$, $SO_x$, particulates, etc. in coal fired boilers, metal pickling processes, fluidized catalytic crackers, regenerators, heavy metal furnaces, and the like.

With the processes disclosed in the above patents, $NO_x$ is reacted with ozone forming higher order oxides of nitrogen, specifically, pentavalent form ($N_2O_5$) or higher which are very soluble and are easily removed by wet scrubbing. In these processes, the stoichiometeric amount of ozone required to convert one mole of $NO_x$ to pentavalent form is about 1.5 moles of ozone. Although the known methods are very effective in achieving ultra low levels of $NO_x$ emissions in the treated gas stream, the cost of ozone makes the processes prohibitively expensive, especially when the gas streams have high levels of $NO_x$, to begin with and the processes generate nitrate/nitric acid in the scrubber purge, requiring disposal in an environmentally safe manner or that they be utilized in the fabrication of a by-product.

Other known processes for the oxidation of $NO_x$ to $NO_2$ by the addition of ozone are disclosed in U.S. Pat. Nos. 4,011,298; 4,035,470; 4,107,271; 4,119,702; 4,247,321; 4,541,999; and 4,564,510. With these processes, oxidized $NO_x$ is absorbed or reacted with various reagents. The patents teach ozone oxidation of $NO_x$. The removal of $NO_x$ increases with an increase in the amount of ozone added. The processes rely upon reaching higher oxides of $NO_x$ to effectively scrub the $NO_x$ from the flue gas stream. The scrubber purge produced in these processes is a mixture of various salts in either aqueous solution or slurry containing sulphite, sulphate, nitrite, nitrate, chlorides, or acids, which are difficult to treat and manage in a waste water treatment plant. With the prior art methods at molar ratios of approximately 0.5 removal efficiencies are very low and are not particularly successful in attaining the required $NO_x$ removal without creating a significant amount of secondary purge streams.

$NO_x$ in a partially oxidized form (trivalent and tetravalent form) has a lower solubility than pentavalent form and scrubbing is less effective, especially when the concentration of $NO_x$ is low. Using alkali or alkaline earth metal carbonates, bicarbonates or hydroxide as scrubbing reagents improves removal efficiencies. When partially oxidized $NO_x$ is absorbed in alkaline solution both nitrate and nitrite are formed in various concentrations. Suchak et al. discloses in "Absorption Nitrogen Oxides in Alkaline Solutions Selective Manufacture of Sodium Nitrite", Ind.Eng.Chem.Res., vol.29, pgs. 1492-1502 (1990) the method and parametric conditions for selectively making sodium nitrite using partially oxidized $NO_x$ containing process gas. Nitrite formation can be enhanced by preferential formation and transport of nitrous acid ($HNO_2$) in the gas phase into an alkaline medium to form nitrite.

In the absence of an alkali/alkaline, carbonate/hydroxide, nitrous acid in an aqueous medium is unstable in both neutral and acidic pH. 'Nitrous acid breaks down or decomposes into nitric acid ($HNO_3$) and nitric oxide (NO). Nitric oxide is sparingly soluble and, therefore, is released back to the gas phase while nitric acid remains in the solution.

Therefore, there is need for an improved process for removing contaminants, that includes higher concentrations of $NO_x$, with ozone in a cost effective manner that substantially minimizes or eliminates the formation of nitrate in the purge stream from a wet scrubber.

SUMMARY OF THE INVENTION

In accordance with the present invention, there is provided a process for removing contaminants from a flue gas stream of an industrial process comprising the steps of directing a flue gas stream containing nitrogen oxide contaminants at an elevated temperature to an exhaust duct. The flue gas stream from the exhaust duct is quenched with an aqueous medium. The quenched flue gas stream is mixed with ozone in a sub-stoichiometric amount for partial oxidation of $NO_x$ in the flue gas to form a mixture of NO and $NO_2$. The flue gas stream containing NO and $NO_2$ is absorbed into an aqueous medium to form nitrous acid. The $HNO_2$ is mixed with compounds of ammonia to react and release nitrogen.

Further, in accordance with the present invention, there is a provided a process for removing $NO_x$ from an exhaust gas stream that includes the steps of directing a flue gas stream containing nitrogen oxide contaminants at an elevated temperature from a process system to an exhaust duct. The nitrogen oxide contaminants from the exhaust duct are mixed with ozone in a sub-stoichiometric quantity to partially oxidize nitrogen oxide. The partially oxidized nitrogen oxide is contacted with an acidic aqueous medium to form nitrous acid in a liquid phase. The nitrous acid reacts with compounds containing ammoniacal nitrogen to decompose the nitrous acid to release nitrogen from the liquid phase.

Additionally, the present invention is directed to a method for removing contaminants, such as nitrogen oxide, sulfur oxide, particulates, heavy metals and other acid gases from gas streams emitted from chemical, partial, or full combustion processes that includes the step of partially oxidizing nitrogen oxide with a sub-stoichiometric amount of ozone. The partially oxidized nitrogen oxide is absorbed in an acidic medium to form nitrous acid. The nitrous acid is fed with urea in a preselected amount to decompose the nitrous acid to nitrogen.

Accordingly, a principle object of the present invention to provide an improved method and apparatus for removing $NO_x$ and other contaminants from the flue gas stream of an industrial combustion process by partially oxidizing $NO_x$ by ozone to reduce the use of the amount of ozone consumed and the cost associated therewith.

Another object of the present invention is to provide a process for removing high concentrations of $NO_x$ from a flue gas stream by converting the $NO_x$ to nitrous acid for decomposition to nitrogen.

A further object of the present invention is to increase the efficiency and reduce the cost of removing $NO_x$ from a flue gas stream by eliminating or substantively minimizing nitrate formation in a wet scrubber and the need for treating the purge stream.

Another object of the present invention is to provide a method and apparatus for removing nitrogen oxides in an environmentally efficient manner from flue gas streams by forming nitrous acid, which decomposes to nitrogen.

These and other objects of the present invention will be more completely disclosed and described in the following specification, accompanying drawing, and appended claims.

DESCRIPTION OF THE PREFERRED EMBODIMENTS

Figure 1:
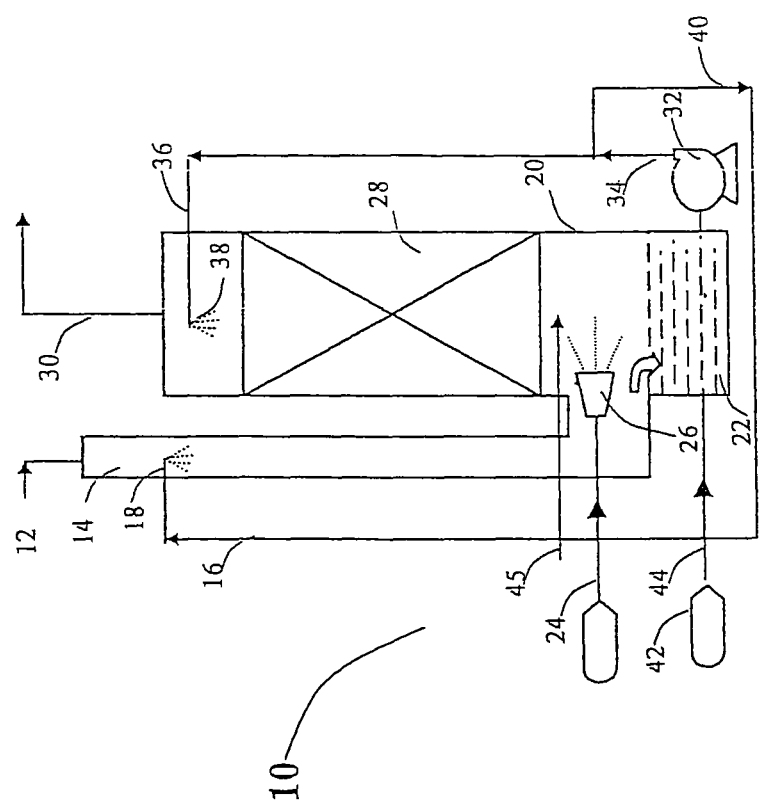
FIG. 1 is a system flow diagram of a process for removing contaminants from a flue gas stream of a combustion process, illustrating the partial oxidation of $NO_x$ and conversion to nitrous acid and decomposition to nitrogen.

Referring to FIG. 1, there is illustrated $NO_x$ and $SO_x$ removal apparatus generally designated by the numeral 10 that is utilized with coal fired process heaters or fossil fuel fired boilers, such as packaged firetube or water-tube boilers. The boiler may be of the type associated with utility power plants or those designated to generate as little as two million BTU/hr. fuel input energy to the boiler. The apparatus 10 is also applicable for use for treatment of process gas streams from chemical, petroleum and petrochemical, metal semiconductor and glass operations, and off gas streams.

With the removal apparatus 10 of the present invention, $NO_x$ is only partially oxidized with ozone in an amount substantially less than required with the known prior art methods and is thereafter absorbed in a wet scrubber to form nitrous acid ($HNO_2$), which is then decomposed in a liquid phase with ammonia compounds resulting in the generation of nitrogen. Consequently, less ozone is required, and the problems associated with the management of nitrate formation in the wet scrubber are eliminated or at least substantially minimized. Instead of absorbing the products of oxidation of $NO_x$ in an alkaline medium, nitrous acid is absorbed in a neutral or acidic medium and then decomposes in the presence of urea to release innocuous nitrogen.

With the removal apparatus 10, $NO_x$ is partially oxidized by thoroughly and rapidly mixing the flue gas with ozone in a sub-stoichiometric amount where the ozone to $NO_x$ molar ratio is 0.5. If all of the $NO_x$ is in the form of nitric oxide (NO), then the stoichiometric amount of ozone required to convert NO to dinitrogen pentoxide ($N_2O_5$) is 1.5 moles of ozone per mole of $NO_x$. Oxidation of $NO_x$ to $N_2O_5$ involves the following reactions:

$$NO + O_3 \rightarrow NO_2 + O_2 \tag{1}$$

$$NO_2 + O_3 \rightarrow NO_3 + O_2 \tag{2}$$

$$NO_2 + NO_3 \rightarrow N_2O_5 \tag{3}$$

With the above reactions, reaction (1) is faster than reactions (2) and (3). Further, reactions (1), (2), and (3) are consecutive reactions. If the amount of ozone added is limited to 0.5 mole of ozone per mole of NO, then the oxidation of $NO_x$ to form $NO_3$ and the subsequent formation of $N_2O_5$ is prevented. This results in a gas stream having approximately equimolar amounts of NO and $NO_2$.

It is well known in the gas phase that small quantities of dinitrogen trioxide ($N_2O_3$) and dinitrogen tetroxide ($N_2O_4$) are formed. NO reacts with $NO_2$ forming $N_2O_3$ until it reaches equilibrium concentration. $N_2O_4$ is also formed as a result of the $NO_2$ dimerization reaction. The following reactions describe the formation of $N_2O_3$ and $N_2O_4$ in the gas phase.

$$2NO_2 \leftrightarrow N_2O_4 \tag{4}$$

$$NO + NO_2 \leftrightarrow N_2O_3 \tag{5}$$

The formation of $N_2O_5$ does not occur because it requires $NO_3$ formation. With the present invention since ozone is added in sub-stoichiometric amounts, where the ratio of ozone to $NO_x$ is approximately 0.5 and the components are well mixed quickly, virtually no ozone is left in the gas stream following the partial oxidation of NO.

If the ozone is not thoroughly and quickly mixed with the $NO_x$, localized concentration of ozone in the gas stream can lead to the formation of $N_2O_5$, which would then subsequently react with water vapor to form nitric acid ($HNO_3$) in the gas phase. Absorption of $N_2O_5$ and $HNO_3$ in a wet scrubber can lead to the formation of nitric acid ($HNO_3$) in the aqueous phase and end up in the purge. This lowers the overall $NO_x$ removal efficiencies compared to that described in this invention. At the preferred sub-stoichiometric mixing of ozone with $NO_x$ at a mole ratio of 0.5 with the present invention, a reduction in ozone costs and the elimination of nitrate formation in the scrubber purge are achieved.

To minimize formation of higher order nitrogen oxides, such as $N_2O_5$ and $HNO_3$, a number of operations can be performed. First, ozone is introduced in the gas phase by a distributor which uniformly distributes ozone in the entire cross section of the flue gas. Preferably, the flue flow for mixing with the ozone is done in a highly turbulent condition. To ensure that the ozone is thoroughly and quickly mixed with the flue gas stream, the velocity of the ozone flow for injection (at an angle) into the flue gas stream is at least twice and preferably three times or more than the velocity of the flue gas steam. The efficiency of the mixing of ozone and flue gas stream can be enhanced by the use of computational fluid dynamic ("CFD") modeling tools. In this manner, the ozone and flue gas stream are thoroughly mixed in a minimum time period. Oxidation of NO to $NO_2$ with ozone is an extremely fast reaction. When a sub-stoichiometric amount of ozone is added to the gas phase, all ozone is consumed converting only part of NO to $NO_2$. Without any ozone remaining in the gas stream, $NO_2$ oxidation to form $NO_3$ and further conversion to $N_2O_5$ is thus prevented. Mixing can be executed in aliquots by multiple distributors. The distributors include conical or diverging nozzles that are operable to quickly disperse ozone in the cross section of the flue gas stream. The ozone can be introduced in the flue gas stream in a co-current or counter-current direction. Further, in accordance with the present invention, the ozone is mixed with a large quantity of the diluent gas. Then the diluted ozone stream is injected by the distributor into mixture with the flue gas stream. This approach avoids localized high concentration of ozone further minimizing $N_2O_5$ formation.

Both $N_2O_4$ and $N_2O_3$ possess higher solubility compared to NO and $NO_2$ but they are far less soluble compared to $N_2O_5$ and removal by scrubbing at low concentration is inefficient. On the other hand, nitrous acid ($HNO_2$) is far more soluble compared to $N_2O_3$ and $N_2O_4$. If $N_2O_3$ (and NO and $NO_2$) is subjected to a higher concentration of water vapor $H_2O$ in the gas phase, a small but appreciable amount of nitrous acid ($HNO_2$) forms. Absorption of tetravalent nitrogen oxides ($NO_2$ and $N_2O_4$) forms both nitrous acid ($HNO_2$) as well as nitric acid ($HNO_3$); whereas, absorption of $N_2O_3$ and $HNO_2$ results selectively in nitrous acid $HNO_2$ in the liquid phase. In order to minimize nitric acid formation, the $NO/NO_2$ ratio is maintained greater than 1 which decreases $N_2O_4$ formation and increasing temperature dissociates $N_2O_4$ into $NO_2$ reducing overall absorption of tetravalent nitrogen oxides. As disclosed in the parametric study by Suchak et al. (1990), selectivity towards nitrite is enhanced by maintaining the NO to $NO_2$ ratio greater than one (i.e. >1) and by scrubbing at an elevated temperature. Scrubbing at an elevated temperature increases the water vapor content of the gas stream which promotes the formation of nitrous acid.

Aqueous scrubbing is a widely accepted technique for removing contaminants from a flue gas stream. If hot flue gas stream is contacted in the wet scrubber or quencher, the water vapor content of the quenched gas increases. With high moisture content and warmer temperature in scrubbing, nitrous acid ($HNO_2$) formation is maximized in the gas phase. When flue gas stream in not hot enough, moisture content may be raised by mixing steam with the flue gas stream prior to entering gas liquid contacting zone. Another way of increasing moisture content is by raising the temperature of the scrubbing medium. For gas phase equilibrium, the following reactions take place:

$$NO+NO_2+H_2O\ (g) \leftrightarrow 2\ HNO_2\ (g) \qquad (6)$$

$$N_2O_3+H_2O\ (g) \leftrightarrow 2\ HNO_2\ (g) \qquad (7)$$

Due to high solubility, $HNO_2$ dissolves readily in the aqueous medium by absorption.

Absorption is presented as:

$$HNO_2\ (g) \leftrightarrow HNO_2\ (l) \qquad (8)$$

Gas liquid contacting devices such as packed, spray, bubble or plate columns are used as scrubbers. They provide high interfacial area for transfer of contaminants from gas to liquid phase. When partially oxidized gas contacts with an aqueous medium, absorption of $HNO_2$ from gas to liquid phase occurs. This initiates formation of $HNO_2$ to re-establish equilibrium in the bulk of gas phase. The formation of $HNO_2$ and removal by absorption occurs simultaneously and continuously as the gas continues contact with liquid and flows from entry to exit of the gas-liquid contacting device. The scrubbing medium and gas contact in either co-current or counter-current direction. The fraction of NOx that forms $HNO_2$ in the gas phase due to gas equilibrium equations (6) and (7) above is small. However, continued removal of $HNO_2$ from gas and transfer to liquid due to absorption drives NO and $NO_2$ to form $HNO_2$ in the gas phase. Also, it should be understood that the scrubber used in the present invention is large enough to continually form $HNO_2$ and absorb to achieve desired removal.

The phenomena of formation of additional $HNO_2$ at the intrerface are stated by Suchak et al. (1990). The additional $HNO_2$ formation at the gas-liquid interface is due to easier transport of NO and $NO_2$ to gas-liquid interface in the manufacture of sodium nitrite. Due to high dissolution rate of $HNO_2$, an additional amount of $HNO_2$ is formed within the gas film (as per forward reactions of 6 and 7 above) exceeding limited $HNO_2$ formation due to the equilibrium in the bulk of the gas. Suchak et al. (1990) also discloses parametric conditions that lead to NOx absorption selectively into nitrite. A somewhat similar mechanism is valid for $HNO_2$ absorption in the acidic aqueous medium as long as nitrous acid concentration does not build up in the scrubber. A higher concentration of $HNO_2$ limits absorption and at low pH (acidic pH) $HNO_2$ decomposes into nitric acid and nitric oxide desorbs from scrubbing liquor.

With the present invention most of NOx is transferred to the aqueous medium or formed in the aqueous medium as nitrous acid ($HNO_2$). Selectivity in nitrous acid formation in the aqueous medium increases with an increase in temperature and an increase in $NO/NO_2$ ratio (greater than 1) which is also controlled by the amount of ozone mixed with the flue gas. Additionally, an increase in NOx removal efficiency is enhanced by increasing scrubber volume.

In order to prevent $HNO_2$ dissociation into $HNO_3$ and NO, it is necessary to deplete $HNO_2$ concentration in the aqueous medium. In accordance with the present invention, the scrubber liquor containing dissolved nitrous acid is further reacted with urea, ammonia or compounds that contain ammonia or release an ammoniacal radical. Urea is introduced either in the scrubber aqueous circulation system or added to the purge from the scrubber. This reaction is favored in acidic pH conditions and preferably at higher than ambient temperature.

When the flue gas stream includes contaminants, such as $SO_2$ and $SO_3$, some sulphurous and sulfuric acids are always formed due to dissolution which may provide the necessary acidic conditions for nitrous acid ($HNO_2$) to react with urea or ammonia. If necessary, a small amount of $H_2SO_4$ or other mineral acids may be added to speed up reaction (9). Nitrous acid reacts with urea as follows:

$$2\ HNO_2\ (l)+CO\ (NH_2)_2 \rightarrow 2\ N_2+CO_2+3\ H_2O \qquad (9)$$

Nitrogen and carbon dioxide are released from the liquid phase and nitrogen oxides captured as nitrous acid are converted to $N_2$.

In operation with the removal apparatus 10 shown in FIG. 1, the hot flue gas stream with contaminants is conveyed from exhaust duct 12 into a quencher 14. The hot flue gas contacts the spray of an aqueous medium supplied from conduit 16 through a spray nozzle assembly 18 into the quencher 14. The flue gas stream is quenched as it is flows through the quencher and conveyed into a base section of wet scrubber 20. Droplets of aqueous medium from the nozzle assembly 18 collect at the bottom of the quencher 14 and are conveyed into a sump 22 of wet scrubber 20.

Ozone is conveyed from a source through a supply conduit 24 to a distributor 26 in a manner that the flue gas stream and the ozone are thoroughly mixed together in a minimum period of time in the preferred sub-stoichiometic amount prior to the flue gas stream entering a packed bed 28 of the wet scrubber 20. The moisture content of the gas phase is increased (when required) by adding steam 45 below packed bed 28 or by raising the temperature of the scrubbing medium.

If the process gas temperature entering the wet scrubber 20 is less than 135° C., the flue gas stream need not be quenched prior to mixing with ozone. In the packed bed 28, the flue gas stream is contacted in a selected direction, either co-current or counter-current (shown in FIG. 1), with an aqueous medium containing urea or compounds of ammonia or compounds that contain ammoniacal nitrogen. The scrubbed flue gas stream exits the packed bed 28 of the wet scrubber 20 through exit duct 30. The aqueous medium used for scrubbing and quenching is pumped out of the scrubber sump 22 by pump 32 and is directed from conduit 34 through conduit 36 to a spray header assembly 38. The aqueous medium is also conveyed from conduit 34 to conduit 40 for supplying the spray nozzle assembly 18 with scrubbing solution for quenching and wetting the incoming hot flue gas stream.

A solution 42 containing urea, ammonia or compounds that provide ammoniacal nitrogen is fed through conduit 44 into the scrubber sump 22. The scrubber sump 22 is also fed with makeup water (not shown) to maintain the liquid level in the sump. A mineral acid is also conveyed through a feed line (not shown) to maintain a selected pH in the sump. The sump 22 is also provided with a purge line (not shown) to limit the concentration of dissolved and suspended solids.

Figure 2:
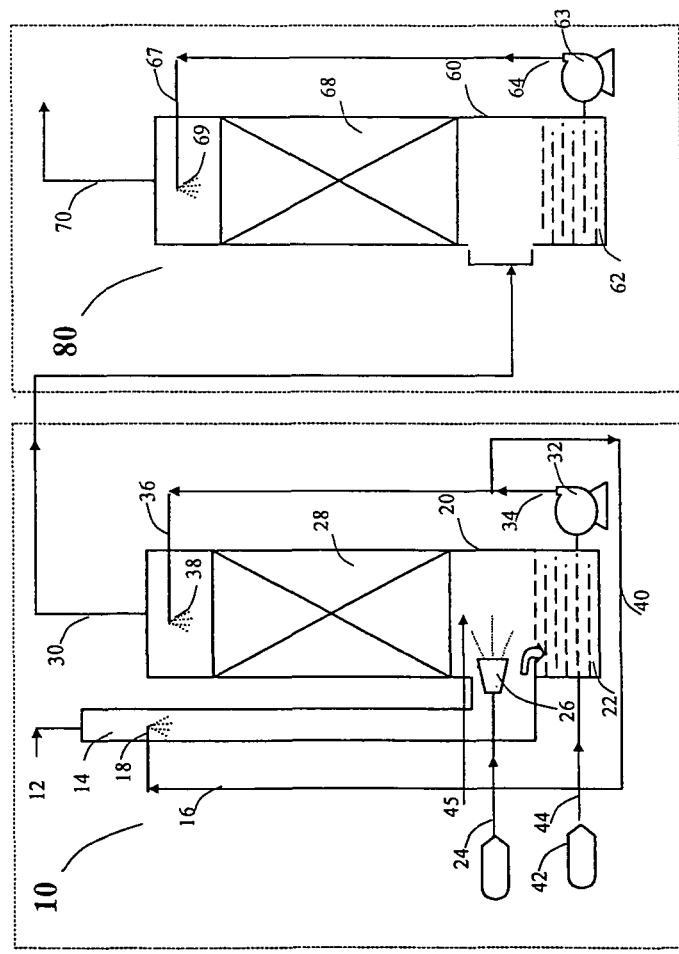
FIG. 2 is a system flow diagram similar to the diagram shown in FIG. 1 of a process for removing contaminants from a flue gas stream of a combustion process, illustrating additional apparatus for scrubbing with reagents.

Now referring to the embodiment shown in FIG. 2 in which like numerals identify like elements shown in FIG. 1 downstream of apparatus 10 gas is further scrubbed in another apparatus 80. The flue gas is further subjected to scrubbing with reagents such as alkali/alkaline metal carbonate/bicarbonate/hydroxide or mixtures to lower other contaminants such as acid gases and NOx.

From the apparatus 10, the treated flue gas stream is conveyed through duct 30 to a second scrubber 60 where the gas stream is contacted in a selected direction, either co-current or counter-current (shown in FIG. 2), with an aqueous medium containing alkaline or alkali metal hydroxide, carbonates, bicarbonates or mixture or compounds of ammonia that scrub contaminants not adequately scrubbed in apparatus 10. Scrubbing medium neutralizes acidic gases such as SOx, HCl, Cl and some residual NOx. The scrubbed flue gas stream exits a packed bed section 68 of the wet scrubber 60 through exit duct 70. The aqueous medium used for scrubbing is pumped out of the scrubber sump 62 by pump 63 and is directed from conduit 64 to a spray header assembly 67 and spray nozzle 69. The scrubber sump 62 is also fed with makeup reagent (not shown) to maintain required strength of the aqueous medium. The sump 62 is also provided with a purge line (not shown) to limit the concentration of dissolved and suspended solids.

Figure 3:
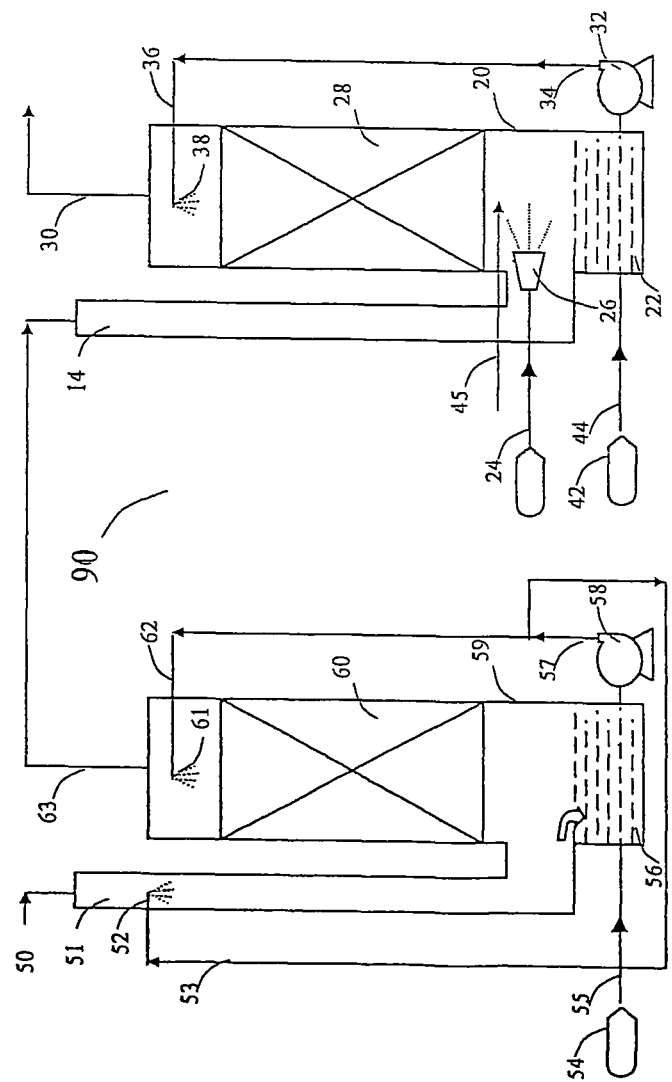
FIG. 3 is an additional system flow diagram similar to FIGS. 1 and 2, illustrating apparatus for quenching and scrubbing hot flue gas prior to subjecting the flue gas to partial oxidation with ozone.

Now referring to the embodiment shown in FIG. 3 in which like numerals identify like elements shown in FIG. 1, there is illustrated removal apparatus 90 for quenching hot flue gas and scrubbing contaminants, such as particulate matters, acid gases (SOx, HCl, Cl etc), mercury and heavy metals, prior to subjecting to partial oxidation with ozone. The hot flue gas stream with contaminants is conveyed from exhaust duct 50 into a quencher 51. The hot flue gas contacts the spray of an aqueous medium supplied from conduit 53 through a spray nozzle assembly 52 into the quencher 51. The flue gas stream is quenched as it flows through the quencher 51 and is conveyed into a base section of wet scrubber 60. Droplets of aqueous medium from the nozzle assembly 52 collect at the bottom of the quencher 51 and are conveyed into a sump 56 of wet scrubber 59

In the scrubber 59, the quenched flue gas stream is contacted in a selected direction, either co-current or counter-current (shown in FIG. 3), with an aqueous medium containing alkaline or alkali metal hydroxide, carbonates, bicarbonates or mixture or compounds of ammonia that scrub contaminants such as particulate matters, heavy metals, acidic gases such as SOx, HCl, Cl. The scrubbed flue gas stream exits the packed bed section 60 of the wet scrubber 59 through exit duct 63. The aqueous medium used for scrubbing is pumped out of the scrubber sump 56 by pump 58 and is directed from conduit to a spray header assembly 62 to spray nozzles 61 in the scrubber 59 and to conduit 53 to spray nozzle assembly 52 in quencher 51. The sump 56 is replenished with reagents via conduit 55 to aqueous medium in the sump 56. The scrubber sump 56 is also fed with makeup water (not shown) to maintain the liquid level in the sump. The sump 56 is also provided with a purge line (not shown) to limit the concentration of dissolved and suspended solids.

Further as shown in FIG. 3, the scrubbed gas stream from exit duct 63 is conveyed to quencher 14 into the wet scrubber 20. Ozone is conveyed from a source through a supply conduit 24 to a distributor 26 in a manner that the flue gas stream and the ozone are thoroughly mixed together in a minimum period of time in the preferred sub-stoichiometic amount prior to the flue gas stream entering a packed bed 28 of the wet scrubber 20. The moisture content of the gas phase is increased (when required) by adding steam 45 below the packed bed section 28 or by raising the temperature of the scrubbing medium.

In the packed bed section 28, the flue gas stream is contacted in a selected direction, either co-current or counter-current, with an aqueous medium containing urea or compounds of ammonia or compounds that contain ammoniacal nitrogen. The scrubbed flue gas stream exits the packed bed section 28 of the wet scrubber 20 through exit duct 30. The aqueous medium used for scrubbing and quenching is pumped out of the scrubber sump 22 by pump 32 and is directed from conduit 34 through conduit 36 to a spray header assembly 38.

As shown in FIG. 3, a solution 42 containing urea, ammonia or compounds that provide ammoniacal nitrogen is fed through conduit 44 into the scrubber sump 22. The scrubber sump 22 is also fed with makeup water (not shown) to maintain the liquid level in the sump. A mineral acid is also conveyed through a feed line (not shown) to maintain a selected pH in the sump. The sump 22 is also provided with a purge line (not shown) to limit the concentration of dissolved and suspended solids.

Unlike NOx oxidation with ozone as described in the U.S. Pat. Nos. 6,162,409; 5,206,002; and 7,303,735, the partial oxidation of NOx in accordance with the present invention does not lead to formation of $N_2O_5$. Partial oxidation of NOx in which only part of NO is converted to $NO_2$ has lesser deterioration of performance with an increase in temperature above 100° C. The partial oxidation of NO takes place extremely fast in the ozone mixing zone. Therefore, by designing efficient mixing of ozone in the gas stream, ozone is introduced either upstream or downstream of a commercially available scrubber, such as the EDV scrubber offered by Belco Technologies and the Dynawave scrubber offered by MECS.

In one example, 4000 scfm of flue gas from a gas furnace was quenched in a scrubber system as shown in FIG. 1. $NO_x$ in a concentration of 4,300 ppm was mixed with ozone where the ozone to $NO_x$ molar ratio was 0.5. Partially oxidized $NO_x$ was scrubbed and $NO_x$ removal efficiency of 83% was attained.

According to the provisions of the patent statutes, I have explained the principle, preferred construction, and mode of operation of my invention and have illustrated and described what I now consider to represent its best embodiments. However, it should be understood that within the scope of the appended claims the invention may be practiced otherwise than as specifically illustrated and described.

I claim:

1. A process for removing contaminants from a flue gas stream of an industrial process comprising the steps of:
   directing a flue gas stream containing nitrogen oxide contaminants from an industrial process at an elevated temperature to an exhaust duct,
   quenching the flue gas stream from the exhaust duct with an aqueous medium,
   mixing the quenched flue gas stream with ozone in a sub-stoichiometric amount for partial oxidation of $NO_x$ in the flue gas to form a mixture of NO and $NO_2$,
   injecting the ozone into the flue gas stream at a flow velocity in a range two to three times greater than the flow velocity of the flue gas stream,
   absorbing the flue gas stream containing NO and $NO_2$ into an acidic medium to form nitrous acid, and
   mixing the nitrous acid with compounds of ammonia to react and release nitrogen.

2. A process for removing contaminants from a flue gas stream as set forth in claim 1 which includes,
   mixing ozone with the quenched flue gas in a molar ratio up to 0.5 mole of ozone to each mole of NO.

3. A process for removing contaminants from a flue gas stream as set forth in claim 1 which includes,
   thoroughly and quickly mixing together the quenched flue gas and ozone in a sub-stoichiometric amount to form a mixture of NO and $NO_2$ and prevent the formation of $NO_3$ and $N_2O_5$.

4. A process of removing contaminants from a flue gas stream as set forth in claim 1 which includes,
   mixing steam with the flue gas stream to raise the moisture content of the flue gas stream prior to quenching the flue gas stream.

5. A process for removing contaminants from a flue gas stream as set forth in claim 1 which includes,
   removing the partially oxidized $NO_x$ from the flue gas stream by absorption in a wet scrubber to form nitrous acid.

6. A process for removing contaminants from a flue gas stream as set forth in claim 1 which includes,
   decomposing the nitrous acid in a liquid phase to release nitrogen.

7. A process for removing contaminants from a flue gas stream as set forth in claim 1 which includes,
   contacting the nitrous acid in a liquid phase with compounds selected from the group consisting essentially of urea, ammonia, compounds containing ammonia, and compounds releasing ammoniacal radical.

8. A process for removing contaminants from a flue gas stream as set forth in claim 1 which includes,
   increasing the formation of nitrous acid in the acidic medium by maintaining the ratio of NO to $NO_2$ greater than one.

9. A process for removing contaminants from a flue gas stream as set forth in claim 1 which includes,
   scrubbing the flue gas stream with a preselected scrubbing medium at an elevated temperature to increase the water vapor content of the flue gas stream to maximize the formation of the nitrous acid in the gas phase and transport to the liquid phase.

10. A process for removing contaminants from a flue gas stream as set forth in claim 9 which includes,
    contacting the flue gas stream in a direction of flow selected from a co-current direction or a counter-current direction with the direction of flow of the scrubbing medium.

11. A process for removing contaminants from a flue gas stream as set forth in claim 1 which includes,
    uniformly distributing ozone in the gas phase in the entire cross section of the flue gas stream.

12. A process for removing $NO_x$ from an exhaust gas stream comprising the steps of,
    directing a flue gas stream containing nitrogen oxide contaminants at an elevated temperature from a process system to an exhaust duct,
    mixing the nitrogen oxide contaminants from the exhaust duct with ozone in a sub-stoichiometric quantity to partially oxidize nitrogen oxide,
    injecting the ozone into mixture with the nitrogen oxide contaminants at a flow velocity in a range two to three times greater than the flow velocity of the flue gas stream,
    contacting the partially oxidized nitrogen oxide with an acidic aqueous medium to form nitrous acid in a liquid phase, and
    reacting the nitrous acid with compounds containing ammoniacal nitrogen to decompose the nitrous acid to release nitrogen from the liquid phase.

13. A process for removing $NO_x$ from an exhaust gas stream as set forth in claim 12 which includes,
    removing contaminants from an industrial process selected from the group consisting of an exhaust gas from fossil fuel fired sources, process gas streams from chemical, petroleum and petrochemical, metal, semiconductor and glass operations, and off gas streams.

14. A process for removing $NO_x$ from an exhaust gas stream as set forth in claim 12 which includes,
    mixing ozone with the nitrogen oxide contaminants up to a molar ratio of 0.5 mole of ozone to each mole of nitric oxide (NO).

15. A process for removing $NO_x$ from an exhaust gas stream as set forth in claim 12 which includes,
    selectively forming the nitrous acid in the liquid phase by maintaining the ratio of NO to $NO_2$ greater than one.

16. A process for removing $NO_x$ from an exhaust gas stream as set forth in claim 12 which includes, reacting the nitrous acid with ammoniacal nitrogen containing compounds selected from the group consisting essentially of urea, ammonia, and compounds containing ammonia.

17. A method for removing contaminants including nitrogen oxide, sulfur oxide, particulates, heavy metals and other acid gasses from gas streams emitted from chemical, partial, or full combustion processes comprising the steps of,
   partially oxidizing nitrogen oxide with a sub-stoichiometic amount of ozone,
   absorbing the partially oxidized nitrogen oxide in an acidic medium to form nitrous acid,
   forming nitrous acid in the acidic medium by maintaining the ratio of NO to $NO_2$ greater than one, and
   feeding the nitrous acid with urea in a preselected amount to decompose the nitrous acid to nitrogen.

18. A method for removing contaminants from gas streams as set forth in claim 17 which includes,
   mixing ozone with nitrogen oxide up to a molar ratio of 0.5 mole of ozone to each mole of nitric oxide to form a mixture of NO and $NO_2$ and prevent the formation of $N_2O_5$.

\* \* \* \* \*